(12) United States Patent
Shirokawa et al.

(10) Patent No.: US 11,257,620 B2
(45) Date of Patent: *Feb. 22, 2022

(54) DIELECTRIC FILM AND ELECTRONIC COMPONENT

(71) Applicant: TDK CORPORATION, Tokyo (JP)

(72) Inventors: Maiko Shirokawa, Tokyo (JP); Raitarou Masaoka, Tokyo (JP); Shohei Fujii, Tokyo (JP); Yusuke Oba, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,137

(22) Filed: Mar. 25, 2020

(65) Prior Publication Data

US 2020/0312557 A1    Oct. 1, 2020

(30) Foreign Application Priority Data

Mar. 26, 2019 (JP) .............................. JP2019-059159

(51) Int. Cl.
*C04B 35/495* (2006.01)
*H01G 4/12* (2006.01)
*H01G 4/10* (2006.01)

(52) U.S. Cl.
CPC ......... *H01G 4/1254* (2013.01); *C04B 35/495* (2013.01); *H01G 4/10* (2013.01)

(58) Field of Classification Search
CPC ............................ C04B 35/495; H01G 4/1254
See application file for complete search history.

(56) References Cited

U.S. PATENT DOCUMENTS

| | | | | |
|---|---|---|---|---|
| 6,569,796 B2* | 5/2003 | Itakura | .................. | C04B 35/453 501/135 |
| 9,567,263 B2* | 2/2017 | Masaoka | ............... | C04B 35/453 |
| 9,745,225 B2* | 8/2017 | Masaoka | ............... | C04B 35/495 |
| 9,748,018 B2* | 8/2017 | Masaoka | ............... | C04B 35/495 |
| 2003/0050179 A1* | 3/2003 | Itakura | .................. | C04B 35/495 501/134 |

(Continued)

FOREIGN PATENT DOCUMENTS

| | | |
|---|---|---|
| CN | 1769243 A | 5/2006 |
| JP | 05148005 A * | 6/1993 |

(Continued)

OTHER PUBLICATIONS

Jun. 28, 2021 Office Action issued in U.S. Appl. No. 16/830,884.

*Primary Examiner* — Karl E Group
(74) *Attorney, Agent, or Firm* — Oliff PLC

(57) ABSTRACT

A dielectric film comprises a complex oxide represented by a general formula $xAO\text{-}yBO\text{-}zC_2O_5$ as a main component, wherein A is at least one selected from barium, calcium and strontium, B is at least one selected from magnesium and zinc, C is at least one selected from niobium and tantalum, x, y and z satisfy relations: $x+y+z=1.000$, $0.375 \leq x \leq 0.563$, $0.250 \leq y \leq 0.500$, and $x/3 \leq z \leq (x/3)+1/9$, and in an X-ray diffraction chart of the dielectric film, a diffraction peak intensity of a (211) plane of the complex oxide or a diffraction peak intensity of a (222) plane of the complex oxide is larger than a diffraction peak intensity of a (110) plane of the complex oxide.

4 Claims, 1 Drawing Sheet

(56) References Cited

U.S. PATENT DOCUMENTS

| | | |
|---|---|---|
| 2011/0001586 A1 | 1/2011 | Toyoda et al. |
| 2015/0274600 A1 | 10/2015 | Masaoka et al. |
| 2016/0115084 A1* | 4/2016 | Masaoka ............... C04B 35/495 501/135 |
| 2016/0376198 A1* | 12/2016 | Masaoka ............... C04B 35/495 501/135 |
| 2016/0379732 A1* | 12/2016 | Masaoka .............. H01G 4/1254 106/286.2 |
| 2017/0275174 A1 | 9/2017 | Uchiyama et al. |

FOREIGN PATENT DOCUMENTS

| | | | |
|---|---|---|---|
| JP | 06338221 A | * | 12/1994 |
| JP | H08-319162 A | | 12/1996 |
| JP | 2015-195342 A | | 11/2015 |
| JP | 2016-084268 A | | 5/2016 |
| KR | 10-2017-0110009 A | | 10/2017 |
| WO | 2009-069707 A1 | | 6/2009 |

\* cited by examiner

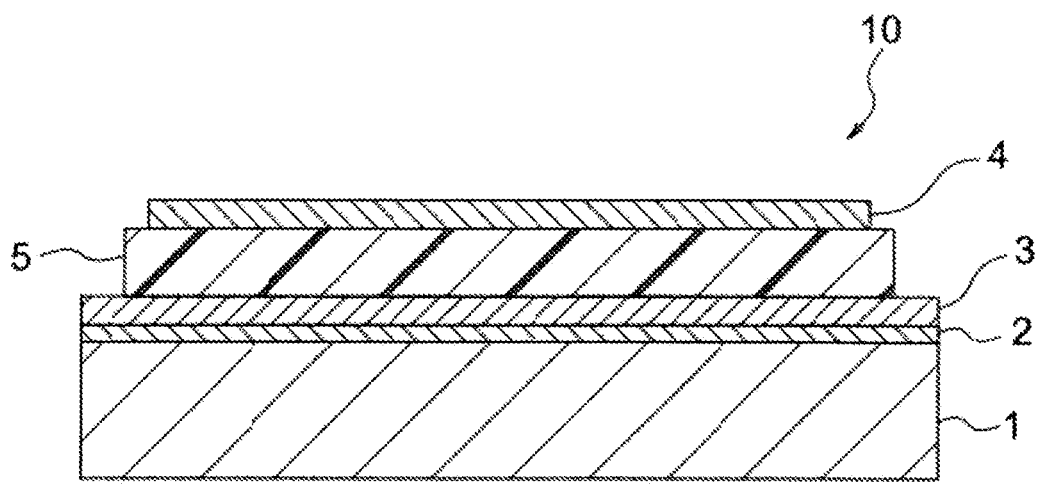

DIELECTRIC FILM AND ELECTRONIC COMPONENT

BACKGROUND OF THE INVENTION

The present invention relates to a dielectric film and electronic component.

In recent years, the number of frequency regions used in mobile communication devices represented by smart phones has increased to achieve high-speed and high-capacity communication. The frequency regions used are high frequency regions such as GHz bands. Some high frequency components operating in the high frequency regions such as baluns, couplers, filters and duplexers or diplexers in combination of filters use dielectric materials as resonators.

Along with performance improvement in mobile communication devices, the number of electronic components mounted on a mobile communication device tends to increase, so that downsizing of electronic components is required in parallel in order to maintain the sizes of the mobile communication device. Due to necessity of reducing the electrode area for downsizing of high frequency components utilizing dielectric material, it is required that the relative permittivity of the dielectric material is high in high frequency regions to compensate the reduction in the capacitance caused thereby.

In Patent Document 1, a dielectric ceramic having a composition off a stoichiometric composition $Ba(Mg_{1/3}Ta_{2/3})O_3$, and the dielectric ceramic having a relative permittivity of about 24 is disclosed.

Patent Document 1: Japanese Patent Laid-Open No. 8-319162

The dielectric ceramic disclosed in Patent Document 1 is, however, a sintered body, which needs to have a sufficient volume to exhibit the dielectric properties shown in Patent Document 1. The disclosed dielectric ceramic, therefore, has the following problem: the size is too large as a dielectric material to be applied to high frequency components used in high frequency regions.

It is an object of the present invention, in the light of these circumstances, to provide a dielectric film having a high relative permittivity in high frequency regions.

BRIEF SUMMARY OF THE INVENTION

The aspects of the present invention to achieve the object are as follows.

[1] A dielectric film comprising a complex oxide represented by a general formula $xAO-yBO-zC_2O_5$ as a main component, wherein A is at least one selected from the group consisting of barium, calcium and strontium, B is at least one selected from the group consisting of magnesium and zinc, C is at least one selected from the group consisting of niobium and tantalum, x, y and z satisfy relations: $x+y+z=1.000$, $0.375 \leq x \leq 0.563$, $0.250 \leq y \leq 0.500$, and $x/3 \leq z \leq (x/3)+1/9$, and a diffraction peak intensity of a (211) plane of the complex oxide or a diffraction peak intensity of a (222) plane of the complex oxide is larger than a diffraction peak intensity of a (110) plane of the complex oxide in an X-ray diffraction chart of the dielectric film.

[2] The dielectric film according to item [1], wherein the diffraction peak intensity of the (211) plane of the complex oxide is larger than the diffraction peak intensity of the (110) plane of the complex oxide, and I(211) and I(222) satisfy a relation of $1.2 \leq I(211)/I(222)$, when the diffraction peak intensity of the (211) plane is represented by I(211) and the diffraction peak intensity of the (222) plane is represented by I(222).

[3] The dielectric film according to item [2], wherein I(211) and I(222) satisfy a relation of $15 \leq I(211)/I(222)$.

[4] An electronic component comprising the dielectric film according to any one of items [1] to [3].

According to the present invention, a dielectric film having a high relative permittivity in high frequency regions can be provided.

BRIEF DESCRIPTION OF THE DRAWING

The FIGURE is a schematic cross-sectional view of a thin film capacitor as an example of electronic components in an embodiment of the present invention.

DETAILED DESCRIPTION OF THE INVENTION

The present invention will be described in detail based on specific embodiments in the following order.
1. Thin film capacitor
　1.1. Overall structure of thin film capacitor
　1.2. Dielectric film
　1.2.1. Complex oxide
　1.3. Substrate
　1.4. Lower electrode
　1.5. Upper electrode
2. Method for manufacturing thin film capacitor
3. Summary of the present embodiment
4. Modified example

1. Thin Film Capacitor

First, as an electronic component according to the present embodiment, a thin film capacitor in which a dielectric layer is constituted from a thin dielectric film is explained.

(1.1. Overall Structure of Thin Film Capacitor)

As shown in FIG. 1, a thin film capacitor 10 as an example of the electronic component according to the present embodiment has a constitution in which a substrate 1, a lower electrode 3, a dielectric film 5, and an upper electrode 4 are stacked in this order. The lower electrode 3, the dielectric film 5, and the upper electrode 4 form a capacitor part and when the lower electrode 3 and the upper electrode 4 are connected to an external circuit and voltage is applied, the dielectric film 5 exhibits a predetermined capacitance, thereby the capacitor part function as a capacitor. Each constitution element will be discussed in detail in below.

Also, in the present embodiment, a foundation layer 2 is formed between the substrate 1 and the lower electrode 3 in order to improve adhesiveness between the substrate 1 and the lower electrode 3. A material constituting the foundation layer 2 is not particularly limited as long as the adhesiveness between the substrate 1 and the lower electrode 3 can be sufficiently secured. For example, when the lower electrode 3 is constituted from Cu, the foundation layer 2 can be constituted from Cr; and when the lower electrode 3 is constituted from Pt, the foundation layer 2 can be constituted from Ti.

Also, in the thin film capacitor 10 shown in FIG. 1, a protective film may be formed for blocking the dielectric film 5 from external atmosphere.

Note that, a shape of a thin film capacitor is not particularly limited, and usually it is rectangular parallelepiped shape. Also, a size of the thin film capacitor is not particularly limited, and a thickness and a length may be determined appropriately depending on the purpose of use.

(1.2. Dielectric Film)

The dielectric film 5 contains a complex oxide to be described later as a main component. In the present embodiment, the main component is a component which accounts for 50 mol % or more in 100 mol % of the dielectric film.

In the present embodiment, the dielectric film 5 is a thin film formed by a known film formation method. Since such a thin film is usually formed by deposition of atoms on a substrate, the dielectric film is preferably a deposited film of dielectric material. The dielectric film does not include a sintered body obtained by firing a green compact of raw material powder of dielectric material (by a solid-state reaction).

The thickness of the dielectric layer 5 is preferably 10 nm to 4000 nm, and more preferably 50 nm to 3000 nm. When the dielectric film 5 is too thin, an insulation breakdown of the dielectric film 5 tends to easily occur. If the insulation breakdown occurs, a capacitor cannot exhibit its function. On the other hand, when the dielectric film 5 is too thick, the electrode area needs to be enlarged to increase the capacitance of the capacitor, so that size and height reduction of electronic components may become difficult depending on the design.

Note that, the thin film capacitor including the dielectric film 5 is processed using FIB (Focused Ion Beam) processing device and the obtained cross section is observed using SEM (Scanning Electron Microscope) and the like, thereby the thickness of the dielectric film 5 can be measured.

(1.2.1. Complex Oxide)

The complex oxide is an oxide containing an element A, an element B and an element C, represented by a general formula $xAO\text{-}yBO\text{-}zC_2O_5$. In the present embodiment, each of the element A and the element B comprises a divalent element and the element C comprises a pentavalent element.

In the general formula, "x" represents the proportion of the number of moles of an oxide AO in 1.000 mole of the complex oxide. In the similar manner, in the general formula, "y" represents the proportion of the number of moles of an oxide BO in 1.000 mole of the complex oxide, and "z" represents the proportion of the number of moles of an oxide $C_2O_5$ in 1.000 mole of the complex oxide.

In the present embodiment, "x", "y" and "z" satisfy relations: $x+y+z=1.000$, $0.375 \le x \le 0.563$, $0.250 \le y \le 0.500$, and $x/3 \le z \le (x/3)+1/9$.

When "x" is a too small, the relative permittivity tends to decrease. On the other hand, when "x" is a too large, the excessive element A easily reacts with carbon dioxide, moisture and the like in the atmosphere, so that the shape retention tends to be difficult due to deterioration of the dielectric film.

When "y" is a too small, the element A is prone to be relatively excessive, so that the tendency described above is shown. When "y" is a too large, cracks tend to occur in the dielectric film.

When "z" is a too small, the element A is prone to be relatively excessive, so that the tendency described above is shown. When "z" is a too large, the element C becomes excessive, so that oxygen defects tend to occur in the dielectric film, which tends to be semi-conductive.

In the present embodiment, the element A is at least one selected from the group consisting of barium (Ba), calcium (Ca) and strontium (Sr). It is preferable that the element A contain at least barium, and in that case, the element A is barium or barium and at least one selected from the group consisting of calcium and strontium. Containing at least barium as the element A tends to result in improvement in the relative permittivity.

In the present embodiment, the element B is at least one selected from the group consisting of magnesium (Mg) and zinc (Zn). It is preferable that the element B contain at least magnesium, and in that case, the element B is magnesium or magnesium and zinc. Containing at least magnesium as the element B tends to result in improvement in the relative permittivity.

In the present embodiment, the element C is at least one selected from the group consisting of niobium (Nb) and tantalum (Ta). It is preferable that the element C contain at least tantalum, and in that case, the element C is tantalum or tantalum and niobium. Containing at least tantalum as the element C tends to result in improvement in the relative permittivity.

The dielectric film in the present embodiment has a preferred orientation plane. The preferred orientation can be obtained by forming the dielectric film using a known film formation method. On the other hand, a sintered body obtained by firing a green compact of raw material powder of dielectric material, i.e., by a solid-state reaction, usually has a random orientation plane, so that the sintered body has no preferred orientation.

The crystallites contained in the dielectric film in the present embodiment has a preferred orientation on a (211) plane or a (222) plane of the complex oxide described above. In other words, the crystallites contained in the dielectric film in the present embodiment is preferentially grown in a <211> direction or a <222> direction.

In the present embodiment, in an X-ray diffraction chart obtained by X-ray diffraction measurement of the dielectric film, the diffraction peak intensity of the (211) plane of the complex oxide or the diffraction peak intensity of the (222) plane of the complex oxide is larger than the diffraction peak intensity of a (110) plane of the complex oxide.

In the complex oxide, the diffraction peak intensity of the (110) plane is usually larger than other diffraction peak intensities. However, in the present embodiment, the preferred orientation plane in the dielectric film is controlled such that the diffraction peak intensity of the (211) plane of the complex oxide or the diffraction peak intensity of the (222) plane of the complex oxide is larger than the diffraction peak intensity of the (110) plane of the complex oxide.

Through the control of the preferred orientation plane, the relative permittivity of the dielectric film is improved. In the present embodiment, it is preferable that the diffraction peak intensity of the (211) plane be larger than the diffraction peak intensity of the (110) plane in the X-ray diffraction chart.

In particular, it is preferable that a ratio of the diffraction peak intensity of the (211) plane to the diffraction peak intensity of the (222) plane be in a specific range.

Specifically, when the diffraction peak intensity of the (211) plane is represented by I(211) and the diffraction peak intensity of the (222) is represented by I(222), it is preferable that I(211) and I(222) satisfy a relation of $1.2 \le I(211)/I(222)$. It is more preferable that I(211) and I(222) satisfy a relation of $15 \le I(211)/I(222)$. The reason is that the preferred orientation on the (211) plane tends to improve the relative permittivity of the dielectric film more in comparison with the preferred orientation on the (222) plane.

In the case of using Cu-Kα radiation as X-ray source, the diffraction peak of the (211) plane appears at a diffraction angle 2θ of around 54°, and the diffraction peak of the (222) plane appears at a diffraction angle 2θ of around 80°.

The preferred orientation plane in the dielectric film may be controlled by a known method. Examples of the method include the type of a film formation method, the substrate temperature in film formation, the energy given in film formation, and the atmosphere in film formation.

Also, the dielectric film according to the present embodiment may include a trace amount of impurities, subcomponents, and the like as long as the present invention can exhibit its effect.

(1.3. Substrate)

The substrate shown in FIG. 1 is not particularly limited as long as it is constituted from a material having mechanical strength which can support the foundation layer 2, the lower electrode 3, the dielectric film 5, and the upper electrode 4 which are formed on the substrate 1. For example, a single crystal substrate constituted from Si single crystal, SiGe single crystal, GaAs single crystal, InP single crystal, $SrTiO_3$ single crystal, MgO single crystal, $LaAlO_3$ single crystal, $ZrO_2$ single crystal, $MgAl_2O_4$ single crystal, $NdGaO_3$ single crystal, and the like; a ceramic polycrystal substrate constituted from $Al_2O_3$ polycrystal, ZnO polycrystal, $SiO_2$ polycrystal, and the like; a metal substrate constituted from metals such as Ni, Cu, Ti, W, Mo, Al, Pt, an alloy of these; and like may be mentioned. In the present embodiment, from the point of low cost and processability, Si single crystal is used as the substrate.

A thickness of the substrate 1 is for example between 10 μm to 5000 μm. When it is too thin, a mechanical strength may not be enough in some case, and when it is too thick, in some case the electronic component cannot be made compact.

The above-mentioned substrate 1 has a different resistivity depending on the material of the substrate. When the substrate is constituted by the material having a low resistivity, current may leak towards the substrate side while the thin film capacitor is running, and this may affect the electric properties of the thin film capacitor. Thus, when the resistivity of the substrate 1 is low, preferably an insulation treatment is performed to the surface of the substrate 1 so that current does not leak towards the substrate 1 side while the capacitor is running.

For example, when Si single crystal is used as the substrate 1, an insulation layer is preferably formed on the surface of the substrate 1. As long as the substrate 1 and the capacitor part are sufficiently insulated, the material constituting the insulation layer and the thickness of the insulation layer are not particularly limited. In the present embodiment, as the material constituting the insulation layer, $SiO_2$, $Al_2O_3$, $Si_3N_x$, and the like may be mentioned as examples. Also, the thickness of the insulation layer is preferably 0.01 m or more.

(1.4. Lower Electrode)

As shown in FIG. 1, the lower electrode 3 is formed in a thin film form on the substrate 1 via the foundation layer 2. The dielectric film 5 is placed between the lower electrode 3 and the upper electrode 4 which is described in below and the lower electrode 3 is an electrode which allows the dielectric film 5 to function as a capacitor. The material constituting the lower electrode 3 is not particularly limited as long as it has conductivity. For example, metals such as Pt, Ru, Rh, Pd, Ir, Au, Ag, Cu, and the like; the alloy thereof; or a conductive oxide; and the like may be mentioned.

A thickness of the lower electrode 3 is not particularly limited as long as the lower electrode 3 functions as an electrode. In the present embodiment, the thickness is preferably 0.01 μm or more.

(1.5. Upper Electrode)

As shown in FIG. 1, the upper electrode 4 is formed in a thin film form on the surface of the dielectric film 5. The dielectric film 5 is placed between the upper electrode 4 and the lower electrode 3 and the upper electrode 4 is an electrode which allows the dielectric film 5 to function as a capacitor. Therefore, the upper electrode 4 and the lower electrode 3 have a different polarity.

As similar to the lower electrode 3, a material constituting the upper electrode 4 is not particularly limited as long as it has conductivity. For example, metals such as Pt, Ru, Rh, Pd, Ir, Au, Ag, Cu, and the like; the alloy thereof; or a conductive oxide; and the like may be mentioned.

2. Method for Manufacturing Thin Film Capacitor

Next, an example of the method for manufacturing a thin film capacitor 10 shown in the FIGURE is described as follows.

First, the substrate 1 is prepared. As the substrate 1, for example when using a Si single crystal substrate, an insulation layer is formed on one of a main face of the substrate. As a method for forming the insulation layer, a known method for forming a film such as a thermal oxidation method, a CVD (Chemical Vapor Deposition) method, and the like may be used.

Next, a thin film made of a material constituting a foundation layer is formed on the insulation layer which has been formed using a known method for forming a film thereby the foundation layer 2 is formed.

After the foundation layer 2 is formed, a thin film made of a material constituting a lower electrode is formed on the foundation layer 2 using a known method for forming a film thereby the lower electrode 3 is formed.

After the lower electrode 3 is formed, a heat treatment may be carried out in order to improve adhesiveness between the foundation layer 2 and the lower electrode 3 and also to improve a stability of the lower electrode 3. As a heat treatment condition, for example a temperature rising rate is preferably 10° C./min to 2000° C./min and more preferably 100° C./min to 1000° C./min. A holding temperature during the heat treatment is preferably 400° C. to 800° C. and a holding time is preferably 0.1 hour to 4.0 hours. When the heat treatment condition is out of the above-mentioned range, the foundation layer 2 and the lower electrode 3 may not adhere sufficiently and also the surface of the lower electrode 3 easily becomes rough. As a result, the dielectric properties of the dielectric film 5 tend to easily decrease.

Next, the dielectric film 5 is formed on the lower electrode 3. In the present embodiment, the dielectric film 5 is formed as a deposition film of which the material constituting the dielectric film 5 is deposited in a film form on the lower electrode 3 by a known method for forming a film.

Examples of the known film formation method include a vacuum deposition method, a sputtering method, a pulse laser deposition (PLD) method, a metal organic chemical vapor deposition (MO-CVD) method, a metal organic decomposition (MOD) method, a sol-gel method, and a chemical solution deposition (CSD) method. In the present embodiment, the sputtering method is preferred from the viewpoints of cost and control of the preferred orientation plane.

Although a trace amount of impurities, subcomponents and the like may be contained in the raw materials to be used in film formation (vapor deposition materials, various target materials, organometallic materials, etc.) in some cases, there are no problems in particular, so long as desired dielectric properties can be obtained.

In the case of using the sputtering method, a target having a desired composition is used to form the dielectric film on the lower electrode. In the present embodiment, it is preferable that the dielectric film be formed as a crystal. The formation of the dielectric film as a crystal makes annealing treatment after film formation unnecessary. Control of the preferred orientation plane therefore becomes easily, so that the relation between the diffraction peak intensity of the (211) plane and the diffraction peak intensity of the (222) plane described above can be easily achieved.

For formation of the dielectric film as a crystal, it is preferable, for example, that the substrate temperature be higher, the electric power inputted during sputtering be larger, and the film formation pressure during sputtering be lower. These film formation conditions may be appropriately combined.

Next, a thin film of material constituting the upper electrode is formed by a known method for forming a film on the dielectric film 5 which has been formed; thereby the upper electrode 4 is formed.

By going through the above-mentioned steps, the thin film capacitor 10 having a capacitor part (the lower electrode 3, the dielectric film 5, and the upper electrode 4) on the substrate 1 as shown in FIG. 1 can be obtained. Note that, a protective film for protecting the dielectric film 5 may be formed so as to cover at least part of the dielectric film 5 which is exposed to outside using a known method for forming a film.

3. Summary of the Present Embodiment

As the main component of the dielectric film obtained by a film formation method, the present embodiment focuses on a complex oxide including an element A selected from barium, calcium and strontium, an element B selected from magnesium and zinc, and an element C selected from niobium and tantalum.

In addition to composition optimization of the complex oxide with proportion of each of the element A, the element B and the element C controlled within the range described above, the preferred orientation plane of the dielectric film is controlled, so that the specified diffraction peak intensities of the complex oxide have specified relations. As a result, the relative permittivity of the dielectric film can be improved.

Although the diffraction peak intensity of the (110) plane of the complex oxide described above is usually largest, the present inventors have found that the relative permittivity of the dielectric film can be improved by making the diffraction peak intensity of the (211) plane or the diffraction peak intensity of the (222) plane larger than the diffraction peak intensity of the (110) plane.

The present inventors have also found that the relative permittivity of the dielectric film can be further improved by making the diffraction peak intensity of the (211) plane larger than the diffraction peak intensity of the (222) plane.

The present inventors have also found that the relations of the peak intensity ratio described above can be obtained by changing the film formation method, the film formation conditions, etc.

4. Modified Example

In the present embodiment, a dielectric film constituting only the dielectric film according to the present embodiment has been described, however, an electronic component may have a multilayer structure with combination of the dielectric film according to the present embodiment and a film of another dielectric composition. For example, a multilayer structure including an existing amorphous dielectric film such as $Si_3N_x$, $SiO_x$, $Al_2O_x$, $ZrO_x$, and $Ta_2O_x$ or a crystal film enables control of temperature change in the impedance and the relative permittivity of the dielectric film 5.

Also, an electronic component may be a multilayer capacitor having a plurality of the dielectric films in the present embodiment.

In the above embodiment, the foundation layer is formed to improve the adhesiveness between the substrate and the lower electrode, however when the adhesiveness between the substrate and the lower electrode can be secured sufficiently, and then the foundation layer may be omitted. Also, when metals such as Cu, Pt, and the like; an alloy thereof; a conductive oxide; and the like which can be used as an electrode is used as the material constituting the substrate, then the foundation layer and the lower electrode can be omitted.

Although the embodiment of the present invention has been described above, the present invention is not limited to the embodiment and various modifications may be made within the scope of the present invention.

EXAMPLES

The present invention is further described in detail with reference to Examples and Comparative Examples. The present invention is, however, not limited to the following Examples.

Example 1 and Comparative Example 1

First, a target required for forming a dielectric film was made as follows.

Each powder of barium carbonate ($BaCO_3$), calcium carbonate ($CaCO_3$) and strontium carbonate ($SrCO_3$) was prepared as the raw material powder of the element A; each powder of magnesium oxide (MgO) and zinc oxide (ZnO) was prepared as the raw material powder of the element B; and each powder of niobium oxide ($Nb_2O_5$) and tantalum oxide ($Ta_2O_5$) was prepared as the raw material powder of the element C. Each of the powders was weighed so as to satisfy compositions of Example 1 and Comparative Example 1.

The weighed raw material powder of the element B, the weighed raw material powder of the element C, water and $ZrO_2$ beads having a diameter of 2 mm were put in a wide mouth polypropylene pot having a capacity of 1 L and wet mixing was carried out for 20 hours. The mixed powder slurry was then dried at 100° C. for 20 hours. The resulting mixed powder was put in a crucible made of $Al_2O_3$ and subjected to primary calcination under firing conditions at a holding temperature of 1250° C. for 5 hours in air atmosphere, so that a primarily calcined powder containing a complex oxide of the element B and the element C was obtained.

The resulting primarily calcined powder, the raw material powder of the element A, water and $ZrO_2$ beads having a diameter of 2 mm were put in a wide mouth polypropylene pot having a capacity of 1 L and wet mixing was carried out for 20 hours. The mixed powder slurry was then dried at 100° C. for 20 hours. The resulting mixed powder was put in a crucible made of $Al_2O_3$ and subjected to secondary calcination under firing conditions at a holding temperature of 1050° C. for 5 hours in air atmosphere, so that a secondarily calcined powder containing a complex oxide of the element A, the element B and the element C was obtained.

Although an AO-$C_2O_5$ compound without containing the element B inhibits generation of the desired AO-BO—$C_2O_5$, the two-step calcination can prevent generation of the AO-$C_2O_5$ compound.

The resulting secondarily calcined powder was put in a mortar and a water solution of polyvinyl alcohol (PVA) at a concentration of 6 wt % as a binder was added to 10 wt % relative to the secondarily calcined powder so as to make a granulated powder by using a pestle. The resulting granulated powder was put in a press mold having a diameter of 100 mm to obtain a green compact with a thickness of about 5 mm by pressure molding using a uniaxial pressing machine. As the molding conditions, the pressure was set at $2.0 \times 10^8$ Pa, and the temperature was set at room temperature.

The resulting green compact was subjected to a binder removal treatment at a temperature rising rate of 100° C./hour and a holding temperature of 400° C., for a temperature holding time of 4 hours in an air atmosphere under normal pressure. Subsequently, the green compact was subjected to firing at a temperature rising rate of 200° C./hour and a holding temperature of 1600° C. to 1700° C., for a temperature holding time of 12 hours in an air atmosphere under normal pressure, so that a sintered body was obtained.

Both surfaces of the obtained sintered body were polished using a cylindrical grinder so that the thickness of the obtained sintered body was 4 mm, thereby the target for forming the dielectric film was obtained.

Next, a square substrate of 10 mm×10 mm having a $SiO_2$ insulation layer with a thickness of 6 m on a surface of the Si single crystal substrate with a thickness of 350 m was prepared. To the surface of this substrate, a Ti thin film having a thickness of 20 nm as a foundation layer was formed by a sputtering method.

Next, on the Ti thin film formed in above, a Pt thin film as the lower electrode having a thickness of 100 nm was formed by a sputtering method.

The formed Ti/Pt thin film was subjected to a heat treatment at a temperature rising rate of 400° C./min and a holding temperature of 700° C. for a temperature holding time of 30 minutes in an oxygen atmosphere under normal pressure.

After the heat treatment, a dielectric film was formed on the Ti/Pt thin film. In the present example, except for sample No. 23, the dielectric film was formed so as to have a thickness of 2000 nm on the lower electrode by the sputtering method using the target made as described above. In the film formation by the sputtering method, conditions on the substrate temperature, the input electric power during sputtering and the film formation pressure shown in Table 1 were employed. In order to expose a part of the lower electrode, a metal mask was used to form a region where the dielectric film was not formed.

In regard to sample No. 23, a dielectric film was formed so as to have a thickness of 400 nm on the lower electrode by a PLD method using the target made as described above. As the film formation conditions, the film formation pressure was set to $1 \times 10^{-1}$ (Pa) and the substrate temperature was set to 200° C. In the same manner as in sample Nos. 1 to 22, in order to expose a part of the lower electrode, a metal mask was used to form a region where the dielectric film was not formed.

In regard to sample No. 22, the formed dielectric film was subjected to an annealing treatment holding at 600° C. for 30 minutes, so that the dielectric film was crystallized.

Next, an Ag thin film as an upper electrode was formed on the obtained dielectric film using a deposition machine. The upper electrode is formed so as to have a shape having a diameter of 100 m and a thickness of 100 nm using the metal mask. Thereby, the thin capacitors (sample Nos. 1 to 23) having the constitution shown in FIG. 1 were obtained.

Note that, a composition of the dielectric film was analyzed using X-ray fluorescence (XRF) element analysis for all of the samples to confirm that the composition matched the composition shown in Table 1. The thickness of the dielectric film was obtained by processing the thin film capacitor by FIB and observing the resulting cross-section by a scanning electron microscope (SEM).

The relative permittivity of each of the all thin film capacitor samples obtained was measured by the following method. Also, the XRD measurement was performed to the dielectric film by the following method, so that the diffraction peak intensity of the (211) plane, the diffraction peak intensity of the (222) plane and the diffraction peak intensity of the (110) plane were calculated.

(Relative Permittivity)

The relative permittivity was calculated from the capacitance of the thin film capacitor sample measured at a reference temperature of 25° C. under conditions at a frequency of 2 GHz and an input signal level (measurement voltage) of 0.5 Vrms using an RF impedance/material analyzer (4991A manufactured by Agilent Technologies, Inc.) and the thickness of the dielectric film obtained as described above. A higher relative permittivity is preferred, and in the present example, samples having a relative permittivity of 30 or more were determined to be good. The results are shown in Table 1.

(XRD Measurement)

The dielectric film was subjected to XRD measurement, and the diffraction peak intensity of the (211) plane, the diffraction peak intensity of the (222) plane and the diffraction peak intensity of the (110) plane in the X-ray diffraction chart obtained were calculated so as to obtain the relations shown in Table 1.

The XRD measurement was performed using Cu-Kα radiation as X-ray source under measurement conditions at a voltage of 45 kV and a current of 200 mA, in the range of 2θ=20° to 90°.

TABLE 1

| | | $xA$—$yBO$—$zC_2O_5$ | | | | | | Film formation conditions | | |
|---|---|---|---|---|---|---|---|---|---|---|
| | | AO | | | BO | | $C_2O_5$ | Substrate | Input electric | |
| | Sample No. | Ba | Ca | Sr | Mg | Zn | Nb | Ta | temperature ° C. | power W | Pressure Pa |
| | | | X | | | y | | z | | | |
| Example 1 | 1 | 0.563 | 0.000 | 0.000 | 0.250 | 0.000 | 0.000 | 0.188 | 200° C. | 400 W | 0.1 Pa |
| | 2 | 0.469 | 0.000 | 0.000 | 0.375 | 0.000 | 0.000 | 0.156 | 200° C. | 400 W | 0.1 Pa |
| | 3 | 0.375 | 0.000 | 0.000 | 0.500 | 0.000 | 0.000 | 0.125 | 200° C. | 400 W | 0.1 Pa |
| | 4 | 0.375 | 0.000 | 0.000 | 0.445 | 0.000 | 0.000 | 0.181 | 200° C. | 400 W | 0.1 Pa |
| | 5 | 0.375 | 0.000 | 0.000 | 0.389 | 0.000 | 0.000 | 0.236 | 200° C. | 400 W | 0.1 Pa |
| | 6 | 0.427 | 0.000 | 0.000 | 0.319 | 0.000 | 0.000 | 0.253 | 200° C. | 400 W | 0.1 Pa |
| | 7 | 0.479 | 0.000 | 0.000 | 0.250 | 0.000 | 0.000 | 0.271 | 200° C. | 400 W | 0.1 Pa |

TABLE 1-continued

|  | | x | y | | z | | | | Substrate temp | Input electric power | Pressure |
|---|---|---|---|---|---|---|---|---|---|---|---|
|  | 8 | 0.521 | 0.000 | 0.000 | 0.250 | 0.000 | 0.000 | 0.229 | 200° C. | 400 W | 0.1 Pa |
|  | 9 | 0.465 | 0.000 | 0.000 | 0.328 | 0.000 | 0.000 | 0.208 | 200° C. | 400 W | 0.1 Pa |
|  | 10 | 0.000 | 0.465 | 0.000 | 0.328 | 0.000 | 0.000 | 0.208 | 200° C. | 400 W | 0.1 Pa |
|  | 11 | 0.000 | 0.000 | 0.465 | 0.328 | 0.000 | 0.000 | 0.208 | 200° C. | 400 W | 0.1 Pa |
|  | 12 | 0.465 | 0.000 | 0.000 | 0.000 | 0.328 | 0.000 | 0.208 | 200° C. | 400 W | 0.1 Pa |
|  | 13 | 0.465 | 0.000 | 0.000 | 0.328 | 0.000 | 0.208 | 0.000 | 200° C. | 400 W | 0.1 Pa |
| Comparative Example 1 | 14 | 0.643 | 0.000 | 0.000 | 0.143 | 0.000 | 0.000 | 0.214 | 200° C. | 400 W | 0.1 Pa |
|  | 15 | 0.604 | 0.000 | 0.000 | 0.250 | 0.000 | 0.000 | 0.146 | 200° C. | 400 W | 0.1 Pa |
|  | 16 | 0.375 | 0.000 | 0.000 | 0.556 | 0.000 | 0.000 | 0.070 | 200° C. | 400 W | 0.1 Pa |
|  | 17 | 0.332 | 0.000 | 0.000 | 0.557 | 0.000 | 0.000 | 0.111 | 200° C. | 400 W | 0.1 Pa |
|  | 18 | 0.332 | 0.000 | 0.000 | 0.446 | 0.000 | 0.000 | 0.222 | 200° C. | 400 W | 0.1 Pa |
|  | 19 | 0.375 | 0.000 | 0.000 | 0.334 | 0.000 | 0.000 | 0.292 | 200° C. | 400 W | 0.1 Pa |
|  | 20 | 0.438 | 0.000 | 0.000 | 0.250 | 0.000 | 0.000 | 0.324 | 200° C. | 400 W | 0.1 Pa |
|  | 21 | 0.560 | 0.000 | 0.000 | 0.143 | 0.000 | 0.000 | 0.312 | 200° C. | 400 W | 0.1 Pa |
|  | 22 | 0.465 | 0.000 | 0.000 | 0.328 | 0.000 | 0.000 | 0.208 | 0° C. | 230 W | 0.5 Pa |
|  | 23 | 0.465 | 0.000 | 0.000 | 0.328 | 0.000 | 0.000 | 0.208 | 200° C. | 50 mj (PLD) | 0.1 Pa |

| | XRD | | | Property Relative permittivity |
|---|---|---|---|---|
| | $I(211) > I(110)$ | $I(222) > I(110)$ | $I(211)/I(222)$ | (−) |
| Example 1 | satisfied | satisfied | 0.01 | 31.2 |
| | not satisfied | satisfied | 0.06 | 32.6 |
| | satisfied | satisfied | 0.01 | 31.3 |
| | satisfied | satisfied | 0.14 | 33.3 |
| | satisfied | satisfied | 0.08 | 32.9 |
| | satisfied | satisfied | 1.38 | 35.1 |
| | satisfied | satisfied | 3.83 | 35.9 |
| | satisfied | satisfied | 4.36 | 36.0 |
| | satisfied | satisfied | 20.29 | 37.2 |
| | satisfied | not satisfied | 0.94 | 34.8 |
| | satisfied | not satisfied | 0.64 | 34.5 |
| | satisfied | not satisfied | 0.16 | 30.4 |
| | satisfied | not satisfied | 0.09 | 30.0 |
| Comparative Example 1 | not satisfied | not satisfied | <0.01 | 28.8 |
| | not satisfied | satisfied | <0.01 | 27.8 |
| | not satisfied | not satisfied | <0.01 | 18.2 |
| | not satisfied | not satisfied | <0.01 | 15.2 |
| | not satisfied | not satisfied | <0.01 | 19.6 |
| | satisfied | not satisfied | <0.01 | 22.1 |
| | satisfied | not satisfied | <0.01 | 25.5 |
| | not satisfied | not satisfied | <0.01 | 26.0 |
| | not satisfied | not satisfied | <0.01 | 24.3 |
| | not satisfied | not satisfied | <0.01 | 16.2 |

From Table 1, it was confirmed that samples having relations among "x", "y" and "z" in the range described above and the predetermined diffraction peak intensities satisfying the relations described above exhibited a high relative permittivity in a high frequency region (2 GHz).

On the other hand, it was confirmed that samples having relations among "x", "y" and "z" out of the range described above did not satisfy the relations of the predetermined diffraction peak intensities described above, resulting in a low relative permittivity in the high frequency region. It was also confirmed that even though the relations among "x", "y" and "z" were in the range described above, the relative permittivity in the high frequency region was low without the predetermined diffraction peak intensities satisfying the relations described above.

Examples 2 and 3

Dielectric films were formed under the same conditions as in Example 1, except that the film formation conditions for specimens Nos. 1, 3, 5 and 7 were changed to the conditions shown in Table 2, and the dielectric films were evaluated under the same conditions as in Example 1. The results are shown in Table 2.

TABLE 2

| | | Film formation conditions | | | | | | | | | Property |
|---|---|---|---|---|---|---|---|---|---|---|---|
| | | $xAO$—$yBO$—$zC_2O_5$ | | | Input | | | | | | |
| | Sample | AO Ba | BO Mg | $C_2O_5$ Ta | Substrate temperature | electric power | Pressure | XRD | | | Relative permittivity |
| | No. | x | y | z | ° C. | W | Pa | $I(211) > I(110)$ | $I(222) > I(110)$ | $I(211)/I(222)$ | (−) |
| Example 3 | 1 | 0.563 | 0.250 | 0.188 | 200° C. | 400 W | 0.1 Pa | satisfied | satisfied | 0.01 | 31.2 |
| | 24 | 0.563 | 0.250 | 0.188 | 400° C. | 400 W | 0.1 Pa | satisfied | satisfied | 5.20 | 36.1 |
| | 3 | 0.375 | 0.500 | 0.125 | 200° C. | 400 W | 0.1 Pa | satisfied | satisfied | 0.01 | 31.3 |
| | 25 | 0.375 | 0.500 | 0.125 | 400° C. | 400 W | 0.1 Pa | satisfied | satisfied | 7.28 | 36.4 |

TABLE 2-continued

| | | Film formation conditions | | | | | | | | Property |
|---|---|---|---|---|---|---|---|---|---|---|
| | | xAO—yBO—zC$_2$O$_5$ | | | | Input | | | | |
| | | AO | BO | C$_2$O$_5$ | Substrate | electric | | | XRD | Relative |
| | Sample | Ba | Mg | Ta | temperature | power | Pressure | | | permittivity |
| | No. | x | y | z | ° C. | W | Pa | I(211) > I(110) | I(222) > I(110) | I(211)/4(222) | (−) |
| | 5 | 0.375 | 0.389 | 0.236 | 200° C. | 400 W | 0.1 Pa | satisfied | satisfied | 0.08 | 32.9 |
| | 26 | 0.375 | 0.389 | 0.236 | 400° C. | 400 W | 0.1 Pa | satisfied | satisfied | 1.20 | 35.0 |
| Example 2 | 7 | 0.479 | 0.250 | 0.271 | 200° C. | 400 W | 0.1 Pa | satisfied | satisfied | 3.83 | 35.9 |
| | 27 | 0.479 | 0.250 | 0.271 | 0° C. | 400 W | 0.1 Pa | satisfied | satisfied | 0.26 | 33.8 |

From Table 2, it was confirmed that the relative permittivity improved as the substrate temperature increased. In other words, it was confirmed that the preferred orientation plane of the dielectric film can be controlled by film formation conditions.

Examples 4 to 6

Dielectric films were formed under the same conditions as in Example 1, except that the film formation conditions for sample No. 9 were changed to the conditions shown in Table 3, and the dielectric films were evaluated under the same conditions as in Example 1. The results are shown in Table 3.

TABLE 3

| | | Film formation conditions | | | | | | | | Property |
|---|---|---|---|---|---|---|---|---|---|---|
| | | xAO—yBO—zC$_2$O$_5$ | | | | Input | | | | |
| | | AO | BO | C$_2$O$_5$ | Substrate | electric | | | XRD | Relative |
| | Sample | Ba | Mg | Ta | temperature | power | Pressure | | | permittivity |
| | No. | X | y | z | ° C. | W | Pa | I(211) > I(110) | I(222) > I(110) | I(211)/I(222) | (−) |
| Example 4 | 9 | 0.465 | 0.328 | 0.208 | 200° C. | 400 W | 0.1 Pa | satisfied | satisfied | 20.29 | 37.2 |
| | 28 | 0.465 | 0.328 | 0.208 | 200° C. | 400 W | 0.3 Pa | satisfied | satisfied | 15.80 | 37.0 |
| Example 5 | 29 | 0.465 | 0.328 | 0.208 | 200° C. | 400 W | 0.5 Pa | satisfied | satisfied | 10.69 | 36.7 |
| | 30 | 0.465 | 0.328 | 0.208 | 200° C. | 270 W | 0.1 Pa | satisfied | satisfied | 0.01 | 30.1 |
| Example 6 | 31 | 0.465 | 0.328 | 0.208 | 400° C. | 400 W | 0.1 Pa | satisfied | not satisfied | — | 39.1 |

From Table 3, it was confirmed that the relative permittivity improved as the input electric power increased. It was also confirmed that the relative permittivity decreased as the film formation pressure increased. In other words, it was confirmed that the preferred orientation plane of the dielectric film can be controlled by the film formation conditions.

Further, it was confirmed that the relative permittivity improved in the case where only the diffraction peak of the (211) plane was observed and no diffraction peak of the (222) plane was observed.

According to the present invention, a dielectric film having a high relative permittivity in a high frequency region can be obtained. Such a dielectric film in a thin film form is suitably applied to electronic components for high frequency such as baluns, couplers, filters and duplexers or diplexers in combination of filters.

REFERENCE SIGN LIST

10 . . . Thin film capacitor
1 . . . Substrate
2 . . . Foundation layer
3 . . . Lower electrode
4 . . . Upper electrode
5 . . . Dielectric film

What is claimed is:

1. A dielectric film comprising a complex oxide represented by a general formula xAO-yBO-zC$_2$O$_5$ as a main component, wherein
   A is at least one selected from the group consisting of barium, calcium and strontium,
   B is at least one selected from the group consisting of magnesium and zinc,
   C is at least one selected from the group consisting of niobium and tantalum,
   x, y and z satisfy relations: x+y+z=1.000, 0.375≤x≤0.563, 0.250≤y≤0.500, and x/3≤z≤(x/3)+1/9, and
   a diffraction peak intensity of a (211) plane of the complex oxide or a diffraction peak intensity of a (222) plane of the complex oxide is larger than a diffraction peak intensity of a (110) plane of the complex oxide in an X-ray diffraction chart of the dielectric film.

2. The dielectric film according to claim 1, wherein the diffraction peak intensity of the (211) plane of the complex oxide is larger than the diffraction peak intensity of the (110) plane of the complex oxide, and
   I(211) and I(222) satisfy a relation of 1.2≤I(211)/I(222), when the diffraction peak intensity of the (211) plane is represented by I(211) and the diffraction peak intensity of the (222) plane is represented by I(222).

3. The dielectric film according to claim 2, wherein I(211) and I(222) satisfy a relation of 15≤I(211)/I(222).

4. An electronic component comprising a dielectric film according to claim 1.

* * * * *